United States Patent [19]

Pejcha

[11] 3,984,873
[45] Oct. 5, 1976

[54] HEAD LOADING AND UNLOADING ASSEMBLY FOR A MAGNETIC DISC DRIVE HAVING A ROTARY ACTUATOR

[75] Inventor: Ivan Pejcha, Santa Clara, Calif.

[73] Assignee: Information Storage Systems, Inc., Cupertino, Calif.

[22] Filed: Sept. 16, 1974

[21] Appl. No.: 506,127

[52] U.S. Cl. .................................. 360/105; 360/98
[51] Int. Cl.² .................... G11B 5/54; G11B 21/22; G11B 5/012; G11B 17/00
[58] Field of Search .............................. 360/97–99, 360/105, 106, 109, 77, 78

[56] References Cited
UNITED STATES PATENTS

| | | | |
|---|---|---|---|
| 3,056,962 | 10/1962 | Johnson et al. | 360/98 |
| 3,488,640 | 1/1970 | Dirks | 360/98 |
| 3,772,666 | 11/1973 | Scholz et al. | 360/98 |
| 3,864,750 | 2/1975 | Applequist | 360/105 |

*Primary Examiner*—Robert S. Tupper
*Attorney, Agent, or Firm*—Gerald L. Moore

[57] ABSTRACT

A head loading and unloading assembly for a magnetic disc drive having rotary actuated read/write heads wherein the assembly includes a stationary member positioned adjacent the magnetic disc with means for contacting and lifting the heads off of the disc surface while permitting rotary movement of the heads to remove them from the proximity of the discs.

5 Claims, 9 Drawing Figures

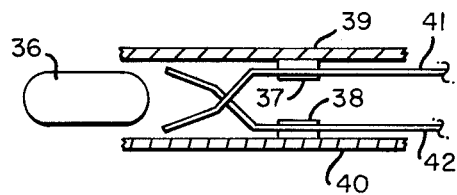
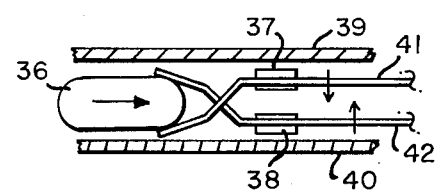
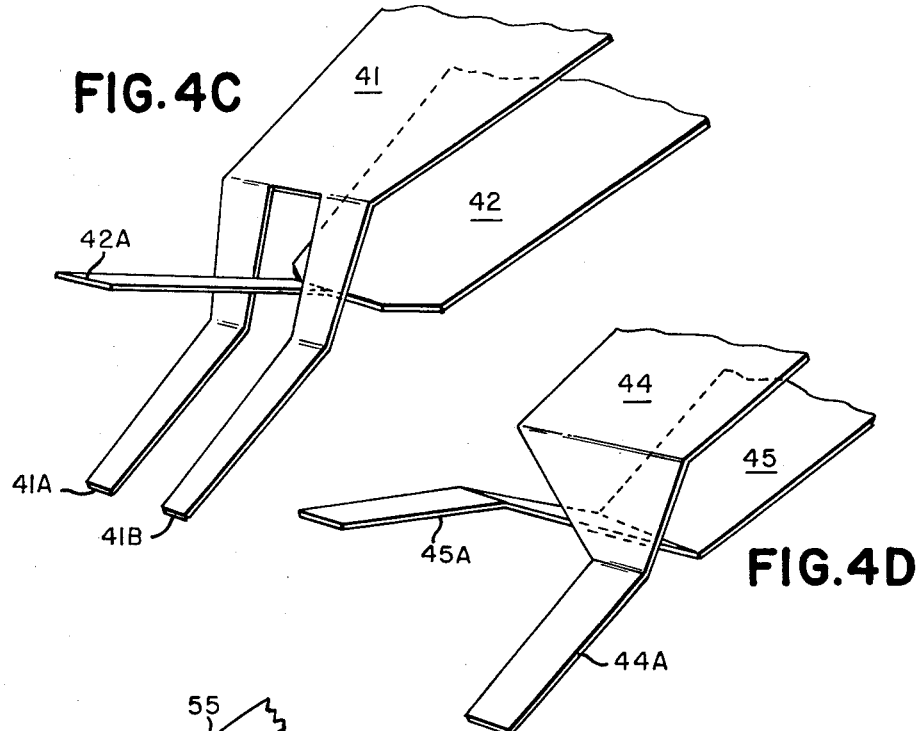
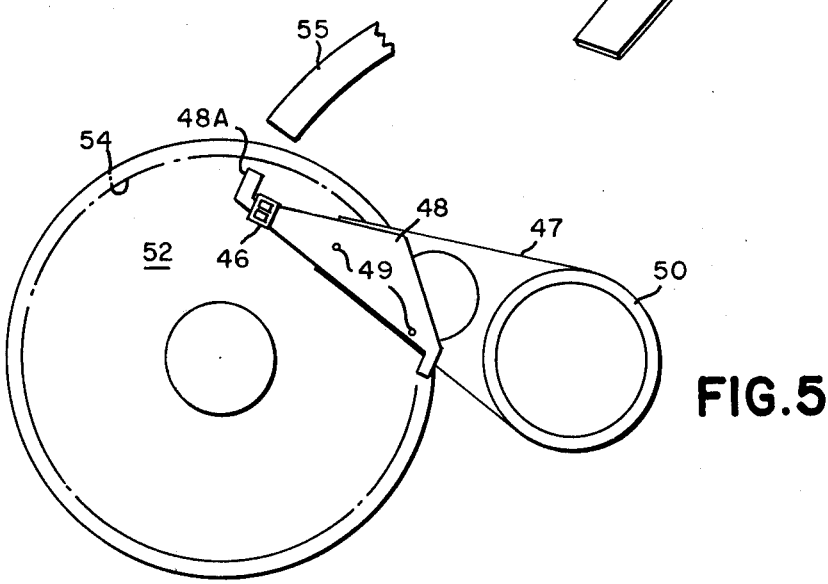

HEAD LOADING AND UNLOADING ASSEMBLY FOR A MAGNETIC DISC DRIVE HAVING A ROTARY ACTUATOR

CROSS-REFERENCE TO RELATED APPLICATIONS

This invention relates to a rotary actuated read/write head assembly such as that disclosed in my copending U.S. Pat. application Ser. No. 506,126, entitled HEAD SUPPORT APPARATUS A ROTARY ACTUATED DISC DRIVE, filed on Sept. 16, 1974, and copending U.S. Pat. application Ser. No. 506,122, entitled DISC DRIVE WITH ROTARY ACCESS MECHANISM, filed on Sept. 16, 1974; both applications are assigned to the present assignee.

BACKGROUND OF THE INVENTION

Disc drive recorders for use in data recording systems comprise, in general, combinations of read/write heads and rotating magnetic discs which interact for the recording of data on a magnetic surface of each disc. The discs usually are assembled in a stacked configuration referred to as disc packs in a manner to be removably set onto the disc drive to thereafter be rotated for movement past the heads. The read/write heads are mounted on a carriage assembly for movement into proximity with the disc surfaces and translation across the disc surfaces so as to read and record data in concentric circles on the disc magnetic surface. The data is recorded by a magnetic interaction between the heads and the magnetic material fixed to the disc.

In the past, the read/write heads, usually one for each disc surface, have been actuated along a straight line across the disc surface. A linear motor positioned to one side of the disc has been utilized to shift a roller bearing supported carriage along a straight line coinciding with a radius of the discs. In this manner the complete head support assembly and heads are all moved an equal distance as translation of the heads across the disc surface is accomplished. While there are certain well recognized advantages to such a head positioning apparatus, one disadvantage involves the inertia which must be overcome to move the heads from position to position.

There now has been developed a method of positioning the heads whereby the head arm assemblies are rotated about a fixed point in a manner to move the heads along an arcuate path across the disc surface. In this apparatus the heads are supported on the distal ends of horizontally extending arms having the opposite end fixed to an assembly mounted for rotation about a vertical axis. By rotation of the arms about an axis spaced from the discs, the heads are moved along an arcuate path roughly intersecting the center point of the discs for reading and writing information on the disc surfaces. Thus the heads are moved about the maximum radius of the apparatus so that higher acceleration can be gained for a quick access to the various track positions on the disc surface. Additionally, the head end of the arms presents less inertial resistance to movement thereby further permitting rapid acceleration between positions.

For positioning of the heads, there is utilized a rotary motor fixed to the rotatable assembly preferably at the axis of rotation which motor, upon energization, moves the heads into and out of proximity to the discs and to various positions spaced across the disc surfaces. The actuator itself varies from the linear actuator previously used in that the armature or rotor generally remains in a constant air gap such that a constant force can be exerted thereon for movement of the heads.

With the realization that the heads can be successfully moved by a rotary mechanism for positioning at the disc surface, it naturally follows that a plurality of head arm assemblies can be moved by the same rotary actuator. Such is not the case with the linear actuator since even if an additional head arm assembly was positioned at the other end of the linear actuator the heads thereon would be moved away from the disc pack while the other set was moved toward the disc pack. In the case of the rotary actuator the rotating discs are positioned at equal distances about the actuator such that each of the read/write heads enter the disc pack area from the same side. Thereafter when all of the heads are moved out of proximity with the disc pack, the disc packs can be removed in the normal manner. As one advantage gained by such an apparatus, the heads address a plurality of data cylinders (data locations on each disc vertically coinciding on one disc pack) at any one positioning of the actuator thereby making more data locations "on-line" for reading and recording of data. Further for the cost of only a single actuator a plurality of disc packs are addressed thereby providing less complicated and hopefully a more economical disc drive.

However, one problem remains which is not present in the linear actuated disc drives. This problem involves the need for loading and unloading the heads as they are moved to a position near the disc surfaces. With the linear actuator, the heads are loaded automatically as they are moved into alignment with the discs by a camming action resulting from interacting surfaces on the supporting arms and a stationary structure on the disc drive. The camming occurs automatically as the heads are moved toward the discs. Since only one head support assembly is utilized per each disc pack and actuator, it is sufficient to utilize the linear movement of the head support assembly for loading and unloading the heads. However with the utilization of rotary actuators, and particularly where a plurality of disc packs are used with one actuator, there has developed a need for unloading one set of heads possibly while continuing actuation of heads associated with another disc pack. This need arises for many reasons, not the least of which involves the possibility that disc packs may not be assembled at all positions thereby requiring the heads at the location where a disc pack is not mounted to be maintained unloaded while permitting the positioning of the heads at the other locations where a disc pack is in position. Thus the present invention is directed to the providing of head loading and unloading apparatus which can be used with rotary actuated heads with particular application in disc drives utilizing a plurality of sets of rotary actuated heads cooperating with a plurality of disc packs.

SUMMARY OF THE INVENTION

In a magnetic disc drive apparatus the combination of a rotatable recording disc and a read/write head adapted to interact with the recording disc to read and record data thereon, with the head being positioned by a rotary actuator including a head supporting arm for supporting the head at the distal end theeof and with the actuator being energizable to move the head in an arcuate path across the disc surface for addressing the various concentric data tracks on the disc, with head loading means adapted to move the head toward and away from the disc surface by contact with the head supporting arm at the distal end thereof while permitting arcuate movement of the head supporting arm and head.

DESCRIPTION OF THE DRAWING

FIGS. 4A and 4B are views similar to FIG. 3 showing a second embodiment of the head loading apparatus;

FIGS. 4C and 4D are enlarged perspective partial views of the head loading apparatus shown in cross-section in FIGS. 4A and 4B; and FIG. 5 shows still another embodiment of the present invention.

DESCRIPTION OF THE INVENTION

Figure 1:
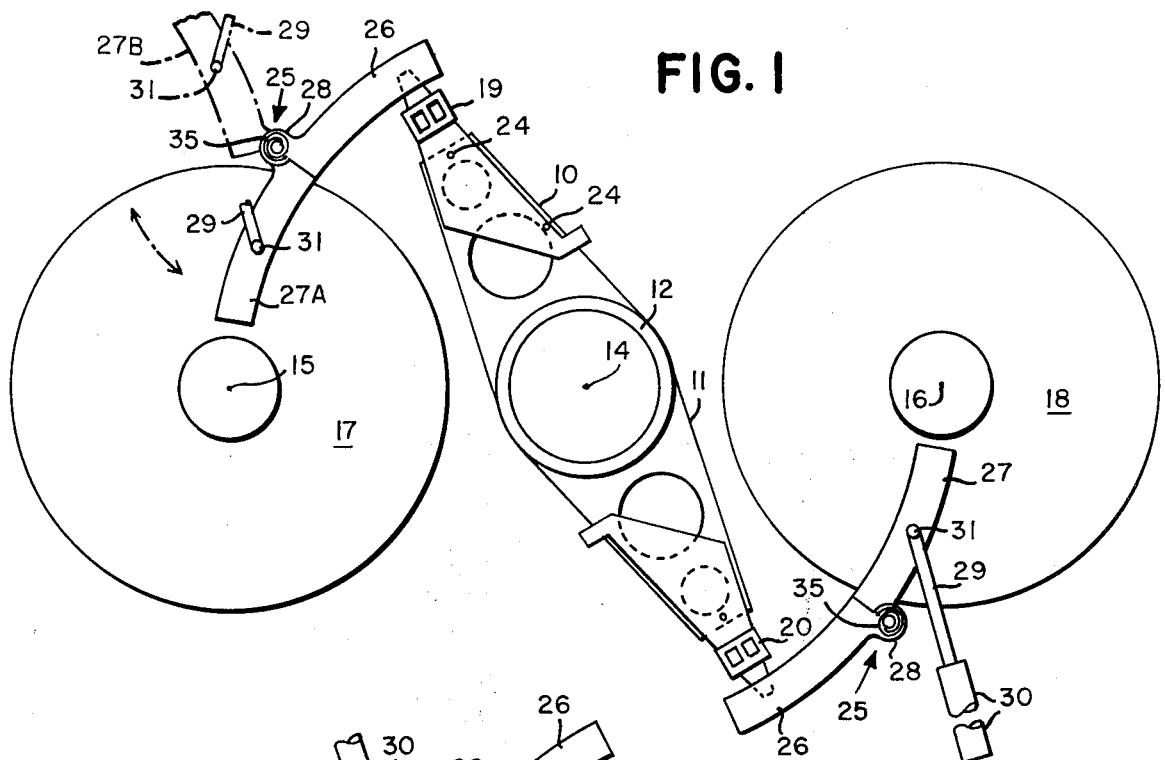
FIG. 1 is a top plan view of a rotary actuated head arm assembly and a pair of disc packs.
Figure 2:
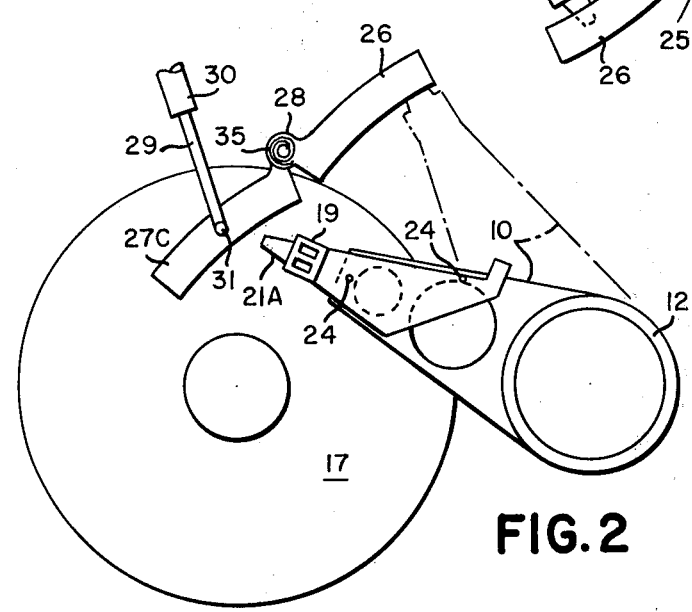
FIG. 2 shows partial actuation of a head loading apparatus on a rotary actuated disc drive.
Figure 3A:
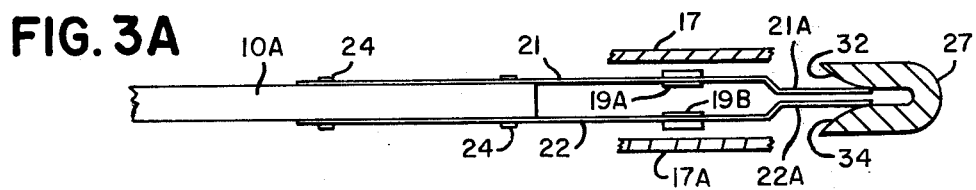
FIGS. 3A and 3B are enlarged cross-sectional views of the recording heads and the associated head loading apparatus showing the heads in the unloaded and loaded positions respectively.
Figure 3B:
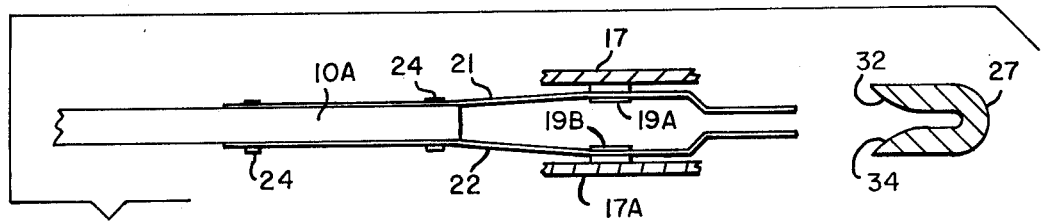

In FIG. 1 is shown a disc drive mechanism comprising head support arms 10 and 11 supported at one end by a rotary actuator 12 adapted to rotate the arms about a vertical central axis 14. While the actuator is not shown in detail, it generally comprises a motor capable of movement to and stopping at various positions in an arc generally extending from the position of the heads shown in the drawing to a position immediately adjacent to the vertical axes 15 and 16 about which a pair of magnetic recording discs 17 and 18 rotate. By energization of the actuator 12 to cause rotation about the axis 14, the read/write heads 19 and 20 are moved to a position over the discs 17 and 18 respectively for effecting the recording and reading operations. Of course a plurality of arm combinations 10 and 11 can be stacked vertically to cooperate with a plurality of vertically spaced discs at each disc pack location such that the heads interfit between the discs in the manner shown in FIGS. 3A and 3B. In FIG. 3A the top disc 17 and the next adjacent disc 17A are fixed to rotate about the same axis in spaced relationship with the head 19A and 19B supported by the same arm 10A. The heads are mounted on a pair of spring members 21 and 22 to permit movement from the unloaded position shown in 3A (wherein the heads are spaced away from the disc surfaces) to the normal or loaded position shown in FIG. 3B (wherein the heads are positioned at flying or recording height above the disc surfaces). The spring members 21 and 22 are fixed to the distal end of the arm 10A by bolt fasteners 24.

As explained heretofore, there remains the need to load and unload the heads, that is, move the heads vertically toward and away from the disc surfaces. Such head loading movement is necessary because the heads must be moved vertically away from the plane of the disc surface while out of the proximity to the disc recording surface and be moved over the disc surface and then be loaded —or moved to a recording position adjacent the surface — prior to the initiation of the recording or reading of the data. Additionally, in the drive shown in FIG. 1 it is possible that only one disc pack 17 or 18 might be in position at one time with the need arising to actuate the associated head arm assembly while maintaining the head arm assembly not in use in the unloaded position. Thus the head loading mechanism must be adapted to not only manipulate the heads in a vertical direction relative to the disc surface but also to permit arcuate positioning of the heads while the heads are either loaded or unloaded. It is for this purpose that the subject invention is provided.

In accordance with the present invention there is provided in the preferred embodiment a head unloading mechanism 25 comprising a stationary channel piece 26 fixed in position on the disc drive. Affixed thereto is a movable channel 27 pivotally mounted by a hinge 28 to the end of the channel 26 nearest the adjoining disc. An arm 29 extending from an actuator 30 is pivotally fixed to the channel 27 by a pin 31. The actuator 30 can be of any type but preferably is an electrical solenoid type actuator which upon energization will pull the channel 27A (FIG. 1) from the solid line position shown adjacent to the disc 18 to the phantom line position shown. In this manner the unloading mechanism can be moved to a position permitting removal and replacement of the disc packs as previously discussed.

To explain the head loading and unloading operation of the mechanism, the channel 27 is shown in FIG. 3A in the head unloading position contacting the extending ends 21A and 22A of the spring members 21 and 22. These spring members extend horizontally in spaced relationship such that with the movement of the channel member 27 to the position shown adjacent disc 18 (FIG. 1) the internally facing channel surfaces 32 and 34 will contact the spring extensions 21A and 22A respectively to force the spring members together to the position shown in FIG. 3A. Similarly by movement of the channel 27 to the phantom line position shown in FIG. 1 the spring extensions 21A and 22A are permitted to extend free of the channel and move toward the normal position with the heads loaded against the adjacent surfaces of the discs 17 and 17A. Thus it can be seen that with the heads in any position above the cooperating disc surface, the channel 27 can be moved to the head unloading position shown in FIG. 1 to shift the heads away from the disc surface. Preferably this channel is spring-loaded to the position shown in solid line in FIG. 1 with the actuator 30 being electrically operated. Thus with a power failure in the disc drive, the spring 35 will move the channel 27 to that position shown in solid in FIG. 1 adjacent disc 18. As a result the heads are always shifted to the unloaded position spaced away from the disc surfaces with the occurence of any power failure.

The channel 26 is of an identical cross-section to that of channel 27 such that further movement of the head arm assemblies to the position shown in solid lines in FIG. 1 will permit the heads to be held in the unloaded position during movement away from close proximity to the discs. With retraction of the channel 27 to that shown in the phantom outline 27B, (FIG. 1) the discs can be removed from the disc drive to permit insertion of other disc packs. Additionally the channels 27 can be moved to phantom outline position 27B during normal operation of the disc drive for reading and writing operations to permit the free flow of air across the disc surfaces. In the normal disc drive air frequently is passed across the disc surfaces for purposes of cooling and keeping the surface clean, and with movement of the channel to the phantom position the cooling air flow is not hindered.

FIGS. 4A, 4B and 4C show a second embodiment of the invention wherein a pivoted member 36 (actuated and supported in the same manner as member 27 heretofore described) is provided to interact with the heads for loading and unloading. In this embodiment the heads 37 and 38 are supported for the reading and writing of information on the surfaces of the discs 39 and 40. The heads are supported on the spring members 41 and 42 which are normally biased apart for shifting the heads to the reading and writing position shown in FIG. 4A. However as shown in FIG. 4C, the spring members shown in enlarged detail include the extending fingers 41A and 41B on the spring 41 and the interfitting finger 42A on the spring 42. These members extend outwardly at an acute angle in overlapping relationship such that by the forcing of the unloading arm 36 therebetween they will be cammed to the position shown in FIG. 4B for movement of the heads 37 and 38 away from the surfaces of the discs 39 and 40. Of course a cooperating unloading member of similar cross-section to the member 36 and corresponding in position to that of member 26 heretofore described cooperates to hold the heads in the unloaded position as the heads are moved out of proximity to the disc surface.

In FIG. 4D is shown still another embodiment of the invention wherein the spring members are shown as members 44 and 45 which support the heads in the same manner as in the previous embodiments. Fixed to each of these spring members respectively are extensions 44A and 45A which also interact with a similar unloading arm 36 as previously described.

In FIG. 5 is shown still another embodiment of the invention wherein the heads may only be unloaded as they are moved out of proximity to the disc surface. In the embodiment shown, one head 46 supported on an arm 47 is illustrated. The head is mounted on a spring member 48 by the bolts 49. In the same manner as previously described energization of an actuator 50 causes rotation of the head arm assembly about an axis 51 for movement into and away from proximity to a disc 52. However, in this embodiment it is desired only to unload the heads as they are moved away from the disc surface. For this purpose, the spring 48 includes an extension 48A which as the head is moved to the outer edge 54 of the recording area permits a camming member 55 to contact the spring extension 48A which lifts the head perpendicularly away from the disc surface for unloading the head.

That which is claimed:

1. In a magnetic disc drive apparatus, the combination of: a recording disc having a disc surface; means mounting the disc for rotation about an axis; a read/write head to interact with the disc in a manner to record or read data on the disc; an elongated arm supporting the read/write head at one end and biasing said head into a loaded position adjacent said disc surface to record or read data at adjacent track locations during rotation of the disc; rotary actuator means operatively connected to the end of said arm opposite to the head for moving the head in an arcuate path across the disc surface to effect said reading and recording of data at the adjacent track locations on the disc surface as the disc is rotated, said arcuate path also extending beyond the disc surface; and head loading means contacting said one end of the elongated arm during movement of the head along said arcuate path beyond the disc surface to displace the head from the loaded position adjacent the surface to an unloaded position spaced away from the disc surface; said head loading means positioning the head in the unloaded position while permitting movement of the head and arm by the actuator means.

2. A magnetic disc drive apparatus combination defined in claim 1 wherein said support arm includes spring means on which the head is supported for biasing the head to the loaded position, and the head loading means contacts and deflects said spring means adjacent the head to move the head toward the unloaded position.

3. In a magnetic disc drive apparatus the combination of a plurality of recording discs having two opposed surfaces adapted for recording data thereon; means mounting the plurality of recording discs for rotation about a single axis; a plurality read/write heads for recording and reading information; a plurality of elongaterd arms extending between adjacent discs, each supporting at one end a pair of heads interacting with adjacent disc surfaces and biasing said heads into loaded positions adjacent respective disc surfaces; rotary actuator means connected to the ends of said elongated arms spaced from the heads for pivoting the arm about an axis to move the heads through an arcuate path across the disc surface, said arcuate path also extending beyond the discs and head loading means contacting said one end of the arms during said movement of the head beyond the discs to move the heads away from the cooperating disc surface to an unloaded position.

4. A magnetic disc drive apparatus combination as defined in claim 3 wherein each of said elongated arms includes a pair of spring members, each supporting one head adjacent a separate recording disc surface, and the head loading means contacts said spring members to deflect and cause movement of the spring members to move the heads away from the cooperating disc surface.

5. A magnetic disc drive apparatus combination as defined in claim 4 wherein said head loading means include cam surfaces which extend along the arcuate path of the heads and which contact and deflect the spring members while permitting movement thereof across the disc surface.

* * * * *